US005539204A

United States Patent [19]

[11] Patent Number: 5,539,204
[45] Date of Patent: Jul. 23, 1996

Coutts et al.

[54] MASS SPECTROMETER VACUUM HOUSING AND PUMPING SYSTEM

[75] Inventors: Gerald W. Coutts, Livermore; John F. Bushman, Oakley; Terry W. Alger, Tracy, all of Calif.

[73] Assignee: Regents of the University of California, Oakland, Calif.

[21] Appl. No.: 386,781

[22] Filed: Feb. 10, 1995

[51] Int. Cl.[6] .............................. B01D 59/44; H01J 49/00

[52] U.S. Cl. .............................. 250/289; 250/288

[58] Field of Search .............................. 250/288, 287, 250/289

[56] References Cited

U.S. PATENT DOCUMENTS

| | | | |
|---|---|---|---|
| 3,641,339 | 2/1972 | McCormick | 250/41.9 G |
| 3,842,266 | 10/1974 | Thomas | 250/288 |
| 3,866,041 | 2/1975 | Attia | 250/281 |
| 4,686,365 | 8/1987 | Meek et al. | 250/281 |
| 4,888,295 | 12/1989 | Zaromb et al. | 436/161 |
| 5,153,433 | 10/1992 | Andresen et al. | 250/296 |
| 5,155,357 | 10/1992 | Hemond | 250/281 |
| 5,313,061 | 5/1994 | Drew et al. | 250/288 |
| 5,360,976 | 11/1994 | Young et al. | 250/288 |

*Primary Examiner*—Bruce C. Anderson
*Attorney, Agent, or Firm*—Henry P. Sartorio; L. E. Carnahan

[57] ABSTRACT

A vacuum housing and pumping system for a portable gas chromatograph/mass spectrometer (GC/MS). The vacuum housing section of the system has minimum weight for portability while designed and constructed to utilize metal gasket sealed stainless steel to be compatible with high vacuum operation. The vacuum pumping section of the system consists of a sorption (getter) pump to remove atmospheric leakage and outgassing contaminants as well as the gas chromatograph carrier gas (hydrogen) and an ion pump to remove the argon from atmospheric leaks. The overall GC/MS system has broad application to contaminants, hazardous materials, illegal drugs, pollution monitoring, etc., as well as for use by chemical weapon treaty verification teams, due to the light weight and portability thereof.

20 Claims, 5 Drawing Sheets

MASS SPECTROMETER VACUUM HOUSING AND PUMPING SYSTEM

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to gas chromatograph/mass spectrometer (GC/MS) systems, particularly to portable GC/MS systems, and more particularly to a mass spectrometer vacuum housing and pumping system.

Instruments which identify unknown chemical compounds using gas chromatograph/mass spectrometry are well known, as exemplified by U.S. Pat. No. 3,641,339 issued Feb. 8, 1972 to A. McCormick. In these early combined gas chromatography/mass spectrometry, the samples were generally carried from the chromatographic column to the mass spectrometer ion source in a carrier gas, usually helium, and the total ion current monitor of the mass spectrometer was used as the gas chromatograph detector. The limit of sensitivity was usually determined by the fluctuations of the carrier gas pressure in the mass spectrometer ion source. Such gas chromatograph/mass spectrometer (GC/MS) systems were large, heavy systems and generally located in laboratories or other research facilities, and thus unknown chemicals must be transported to such facilities for analysis. Such takes considerable time and expense compared to chemical analysis in the field or location of the unknown chemical. However, until recently, portable GC/MS systems were not available. Recent efforts to develop portable chemical analysis systems are exemplified by U.S. Pat. Nos. 4,888,295 issued Dec. 19, 1989 to S. Zaromb et al., and 5,153,433 issued Oct. 6, 1992 to B. D. Andresen et al.

U.S. Pat. No. 4,888,295 is directed to a portable system which includes a small, portable, low-pressure and low-power chromatographic analyzer and a chemical parameter mass spectrometry monitor including an array of sensors for detecting, identifying and measuring the concentrations of a variety of components in the eluent from the chromatographic analyzer. The monitor includes one or more operating condition controllers which may be used to change one or more of the operating conditions during exposure of the sensors to the eluent from the chromatography analyzer to form a response pattern which is then compared with a library of previously established patterns.

U.S. Pat. No. 5,153,433 utilizes a portable mass spectrometer having one or more adjustable electrostatic focusing sectors and an adjustable magnetic focusing sector, all of which are positioned inside a vacuum chamber through which the ion beam to be focused travels, and all of which may be adjusted via adjustment means accessible from outside the vacuum chamber. Mounting of the magnetic focusing sector, including the magnets used to focus the ion beam, entirely within the vacuum chamber, through which the ion beam to be focused travels, permits smaller magnets to be used, thus permitting reductions in both weight and bulk.

Commercially available portable or field deployable GC-MS systems, such as the Viking Spectra Trak, made by Viking Instruments, Reston, Va., are expensive, costing over $150,000 and weigh approximately 150 pounds, and utilize an existing commercial mass spectrometer vacuum system which requires dolly transport. Thus, the prior known portable systems are both expensive and difficult to take to the field because of size and weight thereof. In addition, the power consumption of the prior known portable systems, such as the above-referenced Viking Spectra Trak, is between 1,000 to 1,500 watts depending upon the operational mode. Also, there is a high atmospheric leak rate into the mass spectrometer (MS) vacuum housing due to casing porosity and the sealing method thereof.

The recent environment concerns and market has generated opportunities to widely utilize field deployable GC-MS systems. The critical need for a small portable chemical analysis instrument, which is easy to use in a field environment, but which provides laboratory-grade data, has generated much interest among potential users. The need for such instruments is worldwide in scope. The need is driven by the increasing public awareness of environmental issues, and secured by extensive and growing public policy and regulations impacting those issues. The following outlines various current and new future applications for high resolution portable GC-MS instruments:

1. Forensics: The support of law enforcement for the analysis of drugs, crime scene evidence, accident debris, and arson residues.
2. Chemical Weapons and Treaty Monitoring: To assure compliance and the nonproliferation of chemical weapons, which require sensitive and specific analyses.
3. Regional Transit Authorities: For fast response analysis of spills and accidents on the roadways.
4. Environmental Laboratories: To provide an instrument which can be operated in the laboratory or quickly taken out into the field for special analysis projects.
5. Medical and Hospital: Various diagnostic analysis of patients relative to drug overdose, poisoning, and illness which can be carried in ambulance and/or emergency rooms.
6. Universities: Chemical analysis class work and research.
7. Industries: Monitoring chemical wastes, production chemicals, assembly line quality control, and other manufacturing processes.
8. Commercial and Military Airport Security: Looking for bombs (explosive vapors) and drugs (residues) in luggage or packages, and in cargo containers, etc.

More recently, in an effort to satisfy this need a lighter weight, portable high resolution GC/MS system has been developed for field organic chemical analysis with the sensitivity and specificity of a highly sophisticated laboratory GC/MS, and is described and claimed in U.S. application Ser. No. 08/225,111, filed Apr. 8, 1994, by B. D. Andresen et al., entitled "Portable Gas Chromatograph—Mass Spectrometer. This approach includes a conduction heated, forced air cooled small bore capillary gas chromatograph, a self-contained ion/sorption pump system, hydrogen supply, and a dual computer system used to control the hardware and acquire spectrum data, while weighing less than seventy pounds, requiring less than 600 watts of electric power at peak power, and can be incorporated in a 9.5×18×27 inch suitcase.

The portable Viking Instruments GC/MS referenced above, like many portable and laboratory units, employ the Hewlett-Packard mass spectrometer (MS) and its vacuum housing which consists of a cast aluminum housing with a large flat flange sealed with a flat rubber gasket. The vacuum systems for these units are typically based upon mechanical (i.e. turbomolecular) pumps. This combination results with a high atmospheric leak rate into the MS vacuum housing due to casting porosity of the aluminum housing and the sealing method. The mechanical vacuum pumps and control electronics are generally quite heavy, require a generous amount of electrical power, and, since they are high-speed rotational equipment, can fail during system movement.

Thus, there is a need for a readily portable, high resolution gas chromatograph/mass spectrometer (GC/MS) which eliminates the above-referenced leakage problems with commercially available GC/MS systems, and provides a minimum weight, portable system whereby the exact chemical characterization of unknown substances in the environment, at crime scenes, at accident sites, can be determined, or in an emergency room to aid the analysis of a poisonous substance. The present invention eliminates the above-referenced leakage problems, by providing a vacuum housing having cleaned and welded stainless steel tube and other components that are metal gasket sealed, and the vacuum pumps are small and light weight, require simple and minimal electrical controls, and use minimal electric power, which allow packaging into a small, light weight volume that will operate with minimal power requirements.

SUMMARY OF THE INVENTION

It is an object of the present invention to provide a mass spectrometer (MS) housing and pumping system.

A further object of the invention is to provide an MS vacuum housing constructed of stainless steel components and is metal gasket sealed to be compatible with high vacuum operation.

A further object of the invention is to provide an MS vacuum pumping system which consists of a sorption pump to remove atmospheric leakage and outgassing contaminants as well as the carrier gas, and an ion pump to remove atmospheric leaks.

Another object of the invention is to provide a vacuum housing for an MS which is composed of cleaned and welded stainless steel tube components and flanges that are metal gasket sealed.

Another object of the invention is to provide a pumping system for an MS which involve pumps that are small, light weight, require simple and minimal electrical controls, and use minimal electrical power.

Other objects and advantages of the present invention will become apparent from the following description and accompanying drawings. The vacuum housing is composed of cleaned and welded stainless tube components and include flanges which are metal gasket sealed. The housing broadly is composed of two interconnected tubular sections, each section having a flange at the outer end, and the main body section additionally having a plurality of smaller flanges. The vacuum pumps are small and light weight, require simple and minimal electrical controls, and use minimal electrical power. These attributes allow packaging into a small, light weight volume that will operate with minimal power requirements.

BRIEF DESCRIPTION OF THE DRAWINGS

The accompanying drawings, which are incorporated into and form a part of the disclosure, illustrate an embodiment of the invention and, together with the description, serve to explain the principles of the invention.

DETAILED DESCRIPTION OF THE INVENTION

The invention is directed to a vacuum housing and pumping system for a portable gas chromatograph/mass spectrometer (GC/MS). The vacuum housing is constructed from tube components which are welded together with non-rotatable connector flanges welded to the tube components so as to provide a metal gasket sealed housing compatible with high vacuum operation. The housing basically consists of two interconnected tubular sections, each having a flange secured to the open ends thereof, with one tubular section having a plurality of flanges connected thereto. The vacuum pumping system consists of a sorption (getter) pump to remove atmospheric leakage and outgassing contaminants as well as the GC carrier gas (hydrogen), and at least one ion pump to remove the argon from atmospheric leaks.

Figure 1:
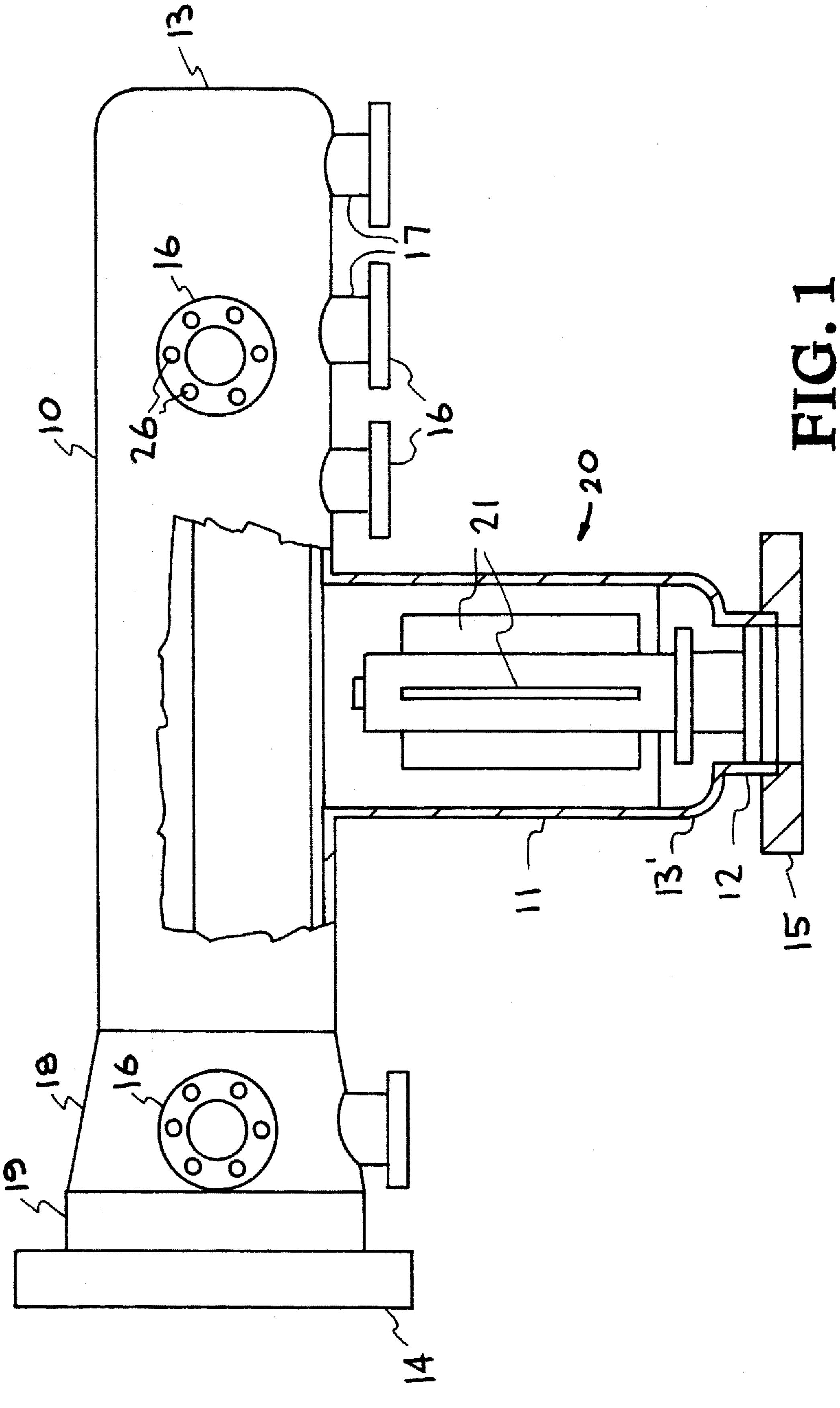
FIG. 1 is a plan view, partially in cross-section, of a vacuum housing composed of welded tube components, in which is mounted a vacuum pump.
Figure 2:
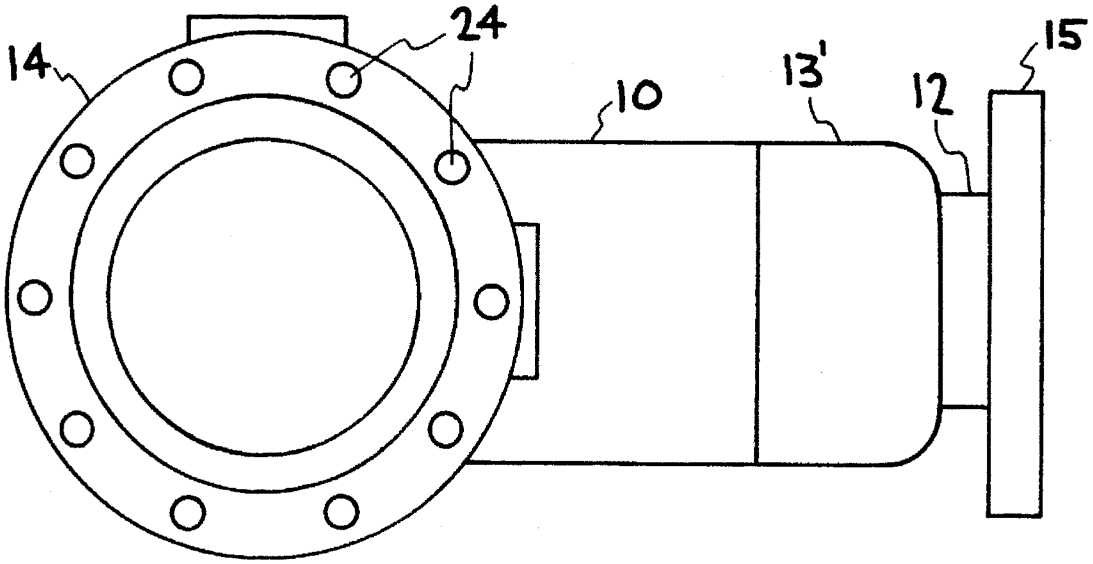
FIG. 2 is an end view of the vacuum housing of FIG. 1.
Figure 4:
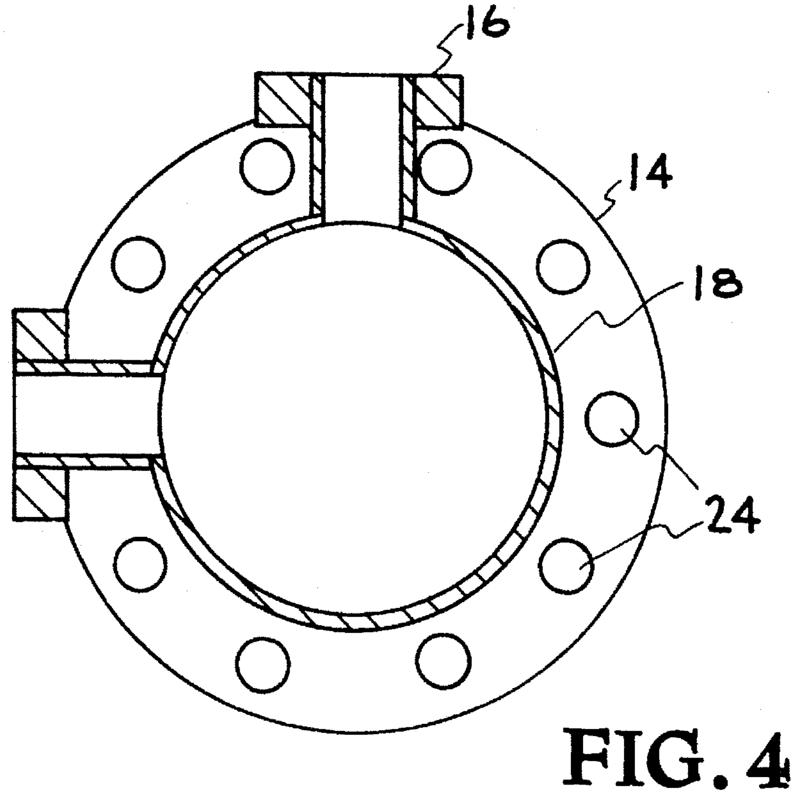
FIGS. 4, 5 and 6 are cross-sectional views of the vacuum housing taken along the lines 4—4, 5—5, and 6—6 of FIG. 3.
Figure 3:
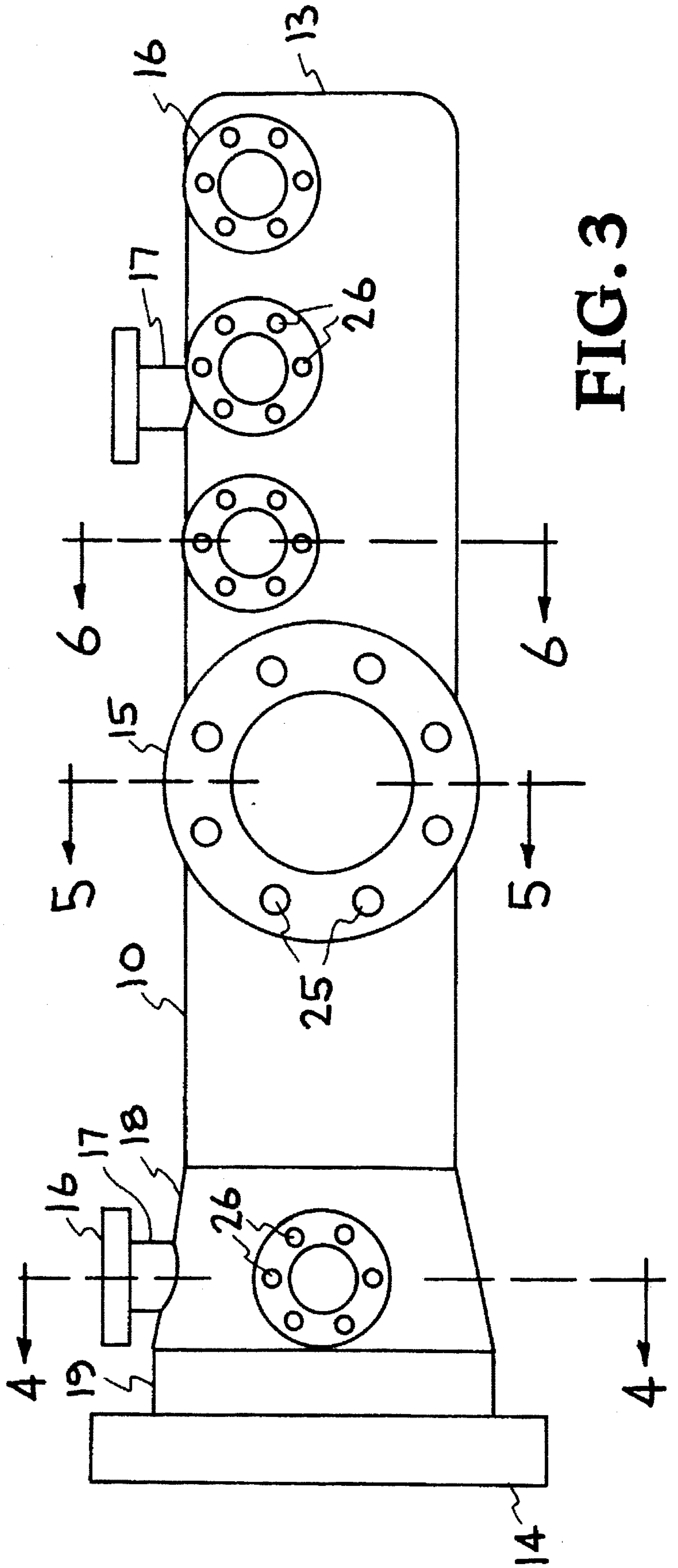
FIG. 3 is a view of the FIG. 1 vacuum housing rotated 90°.
Figure 5:
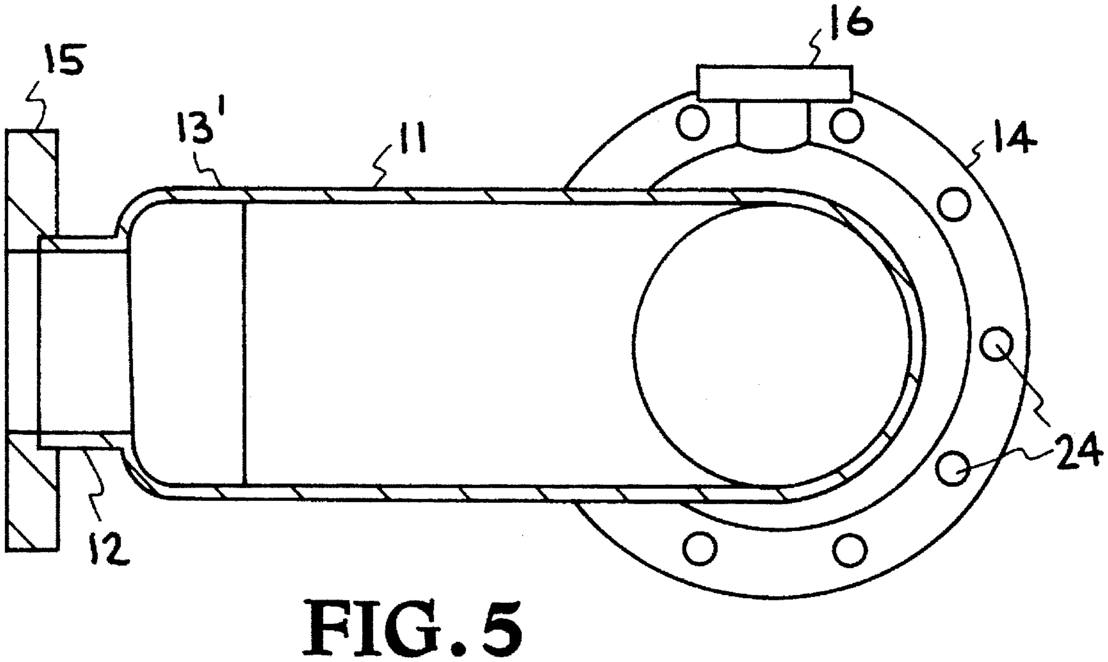
Figure 6:
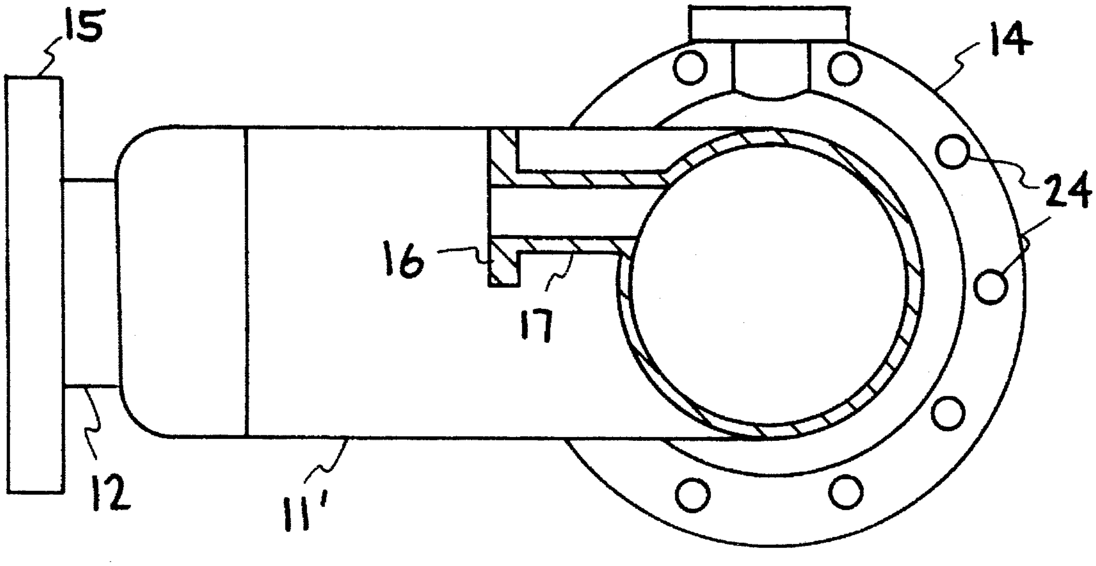

Referring now to the drawings, FIGS. 1 and 3 illustrate the overall vacuum housing with FIG. 3 being rotated 90° with respect to FIG. 1, and FIGS. 4–7 illustrate various components thereof. The vacuum housing consists primarily of a main tubular body section, generally indicated at 10, and a secondary tubular or wing section, generally indicated at 11, and secured by welding to main body section 10, as seen in FIG. 1. Main body section 1 is closed at one end by an end cap or section 13 and is open at the opposite end which terminates in a non-rotatable flange 14. The outer end of secondary section 11 terminates in a non-rotatable flange 15 via a connector tube 12 and an end cap 13' having an opening welded to the connector tube 12. Flange 14 is connected to main body section 10 via a concentric reducer 18 and a tube 19. A plurality (six) smaller non-rotatable flanges 16 are connected by tubes 17 to the main body 10 and concentric reducer 18. All interconnections of the components of the vacuum housing are made by welding to insure a leakproof construction.

Positioned within the secondary or wing section 11 of the vacuum housing is a sorption (getter) pump 20 having fins 21 to remove atmospheric leakage and outgassing contaminants as well as the GC carrier gas. At least one ion pump 22 is connected to at least one of flanges 16 via metal sealed flanges known in the art.

As seen in FIGS. 2–6, the flanges 14, 15 and 16 are provided with a plurality of holes 24, 25 and 26 respectively, through which connectors, such as bolts, pass to secure the flanges to the various associated components. Also, caps or closures, not shown, are mounted on certain of the small flanges 16 when not being utilized. The six (6) small flanges are provided to enable easy interconnection to associated equipment regardless of the position of the main body section 10 when mounted in a GC/MS system, with those flanges not being utilized being capped. However, any number and different location of the flanges 16 may be utilized.

Figure 7:
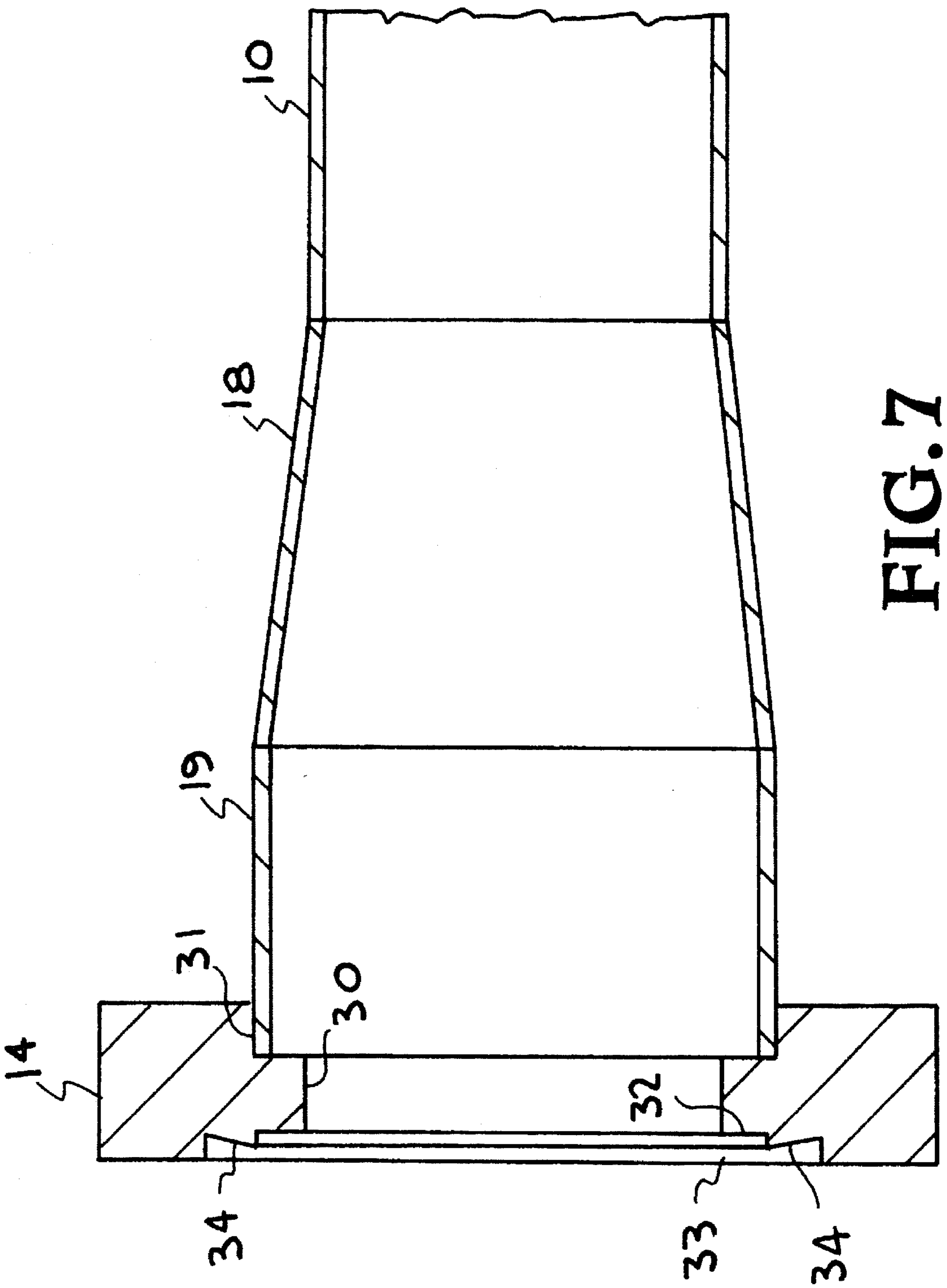
FIG. 7 is an enlarged cross-sectional view of the non-rotatable flange interconnected by a concentric reducer to the main body of the vacuum housing.

FIG. 7 illustrates in detail an embodiment of non-rotatable flange 14, with the holes 24 therein omitted, it being understood that flange 15 and smaller flanges 16 may be constructed in the same manner. The flange 14 includes a central opening 30, an inner counter-sink section 31, an intermediate counter-sink section 32, and an outer counter-sink section 33 having a tapered outer section or periphery 34. Inner counter-sink section 31 is designed to cooperate with an end of tube 19 which extends thereinto, after which a weld therearound provides a leak-proof interconnection. A metal gasket, not shown is positioned in outer counter-sink section 33 and an associated component having a flanged end is secured to flange 14 via bolts in holes 24 and tighten such that the outer edge of the metal gasket is forced into the tapered periphery 34, thereby providing a leak-proof seal.

By way of example, the various components 10–19 of the vacuum housing may be constructed of stainless steel, or aluminum, but all the components should be of the same material, with stainless steel being preferred. The getter pump 20 and ion pump 22 may be of a conventional construction, but designed to be small, light weight, requiring simple and minimal electrical controls, and use minimal electrical power.

To illustrate the small size of the vacuum housing, the following parameters of an embodiment are set forth by way of example, with each of the components being constructed from stainless steel. The body section 10 and secondary or wing section 11 each has a 3.0 inch outer diameter (O.D.) and a 0.028 inch wall of 321 stainless steel (SST); the tube 12 has a 2.0 inch O.D. and a 0.028 inch wall of 321 SST; the end caps 13 and 13' have a 3.0 inch O.D. and a 0.065 inch wall of 304 SST; the flange 14 has a 4.625 O.D. and made of 304 SST; the flange 15 has a 3.375 O.D. and made of 304 SST; the flanges 16 have a 1.333 O.D. and made of 304 SST; the connector tubes 17 have a 0.750 O.D. and a 0.035 inch wall of 304 SST; the concentric reducer 18 has 3 inch O.D. and 3.5 inch O.D. at the outer ends with a 0.083 inch wall of 304 SST; the tube 19 has an O.D. of 3.50 inch and a 0.035 inch wall of 321 SST; and the inner counter-sink section 31 of flange 14 has an outer diameter slightly larger than the 3.50 inch O.D. of tube 19 to allow the tube 19 to be snugly fit into countersink section 31.

It has thus been shown that the present invention provides a vacuum housing and pumping system which is small and light weight, and thus can be utilized in the vacuum system of a portable GC/MS. The vacuum housing is constructed of stainless steel, for example, with all connections being welded and constructed to utilize metal gasket seals, so as to be compatible with high vacuum operation. The pumping system includes small light weight sorption and ion pumps requiring simple and minimal electrical controls, as well as using minimal electric power.

While a specific embodiment has been illustrated and described, and specific materials, parameters, etc. has been set forth to fully describe the invention, such are not intended to be limiting. Modifications and changes may become apparent to those skilled in the art, and it is intended that the invention be limited only by the scope of the appended claims.

We claim:

1. A vacuum housing consisting of:

a pair of interconnected tubular sections;

a first of said pair of tubular sections being closed at one end, open at an opposite end, and provided with a plurality of openings therein;

a first flange secured to said open end of said first tubular section;

a second of said pair of tubular sections having one end secured to a first of said plurality of openings in said first tubular section;

a second flange secured to an opposite end of said second tubular section; and a plurality of additional flanges connected to each of the remaining plurality of openings in said first tubular section.

2. The vacuum housing of claim 1, wherein said first tubular section is closed at said one end by a cap member, and includes a concentric reducer section intermediate said cap member and said first flange.

3. The vacuum housing of claim 2, wherein at least one of said additional flanges is located adjacent said end cap, and wherein at least another of said additional flanges is secured in said concentric reducer section.

4. The vacuum housing of claim 1, wherein said second flange is secured to said second tubular member via a connector tube and an end cap having an opening therein, said connector being connected to said second flange and in said opening in said end cap, and wherein said end cap is secured to said second tubular section.

5. The vacuum housing of claim 1, wherein each of said plurality of additional flanges are connected to said remaining plurality of openings by tubular connector members.

6. The vacuum housing of claim 1, wherein said second tubular section comprises:

a tubular body member having one end connected to said first tubular section;

an end having an opening therein, said end cap being connected to an opposite end of said tubular body member; and a tubular connector connected at one end to said open in said end cap and connected at the opposite end to said second flange.

7. The vacuum housing of claim 1, in combination with a pumping system composed of at least a sorption pump and at least one ion pump.

8. The combination of claim 7, wherein said sorption pump is located in said second tubular section of said vacuum housing.

9. The combination of claim 7, wherein said at least one ion pump is connected to one of said additional flanges.

10. A vacuum housing comprising:

a first tubular section closed at one end, open at an opposite end, and provided with a plurality of openings therein;

a first flange secured to said open end of said first tubular section;

said first tubular section comprising:

a tubular body section;

an end cap secured to one end of said tubular body section;

a concentric reducer section connected at one end to said tubular body section; and a tubular member connected at one end to an opposite end of said concentric reducer section;

said tubular member being connected at an opposite end to said first flange;

a second tubular section having one end secured to a first of said plurality of openings in said first tubular section;

a second flange secured to an opposite end of said second tubular section; and a plurality of additional flanges connected to each of the remaining plurality of openings in said first tubular section.

11. The vacuum housing of claim 10, wherein said tubular body section is provided with said plurality of openings, at least one of said plurality of openings being of a larger diameter, said second tubular section being secured to said larger diameter opening.

12. The vacuum housing of claim 11, wherein said concentric reducer section s provided with at least one opening therein, and wherein one of said plurality of additional flanges is secured to said one opening in said concentric reducer section.

13. The vacuum housing of claim 12, wherein said concentric reducer section is provided with a plurality of openings located about a diameter thereof, each opening having one of the plurality of additional flanges secured thereto.

14. The vacuum housing of claim 11, wherein at least one of said plurality of openings in said tubular body section is connected to another of said plurality of additional flanges.

15. The vacuum housing of claim 14, wherein said plurality of openings in said tubular body section include a plurality of axially aligned opening and at least one opening located from said aligned openings about a diameter of said tubular body section, each of said opening having one of the plurality of additional flanges secured thereto.

16. The vacuum housing of claim 15, wherein at least said axially aligned opening are located intermediate said larger diameter opening and said end cap secured to said tubular body section.

17. The vacuum housing of claim 16, wherein said axially aligned openings in said tubular body section are aligned with an opening in said concentric reducer section.

18. In a gas chromatograph/mass spectrometer, the improvement comprising:

a vacuum housing constructed of sealed stainless steel tubular sections having flanges constructed for use with metal gaskets;

at least one of said flanges including:

a body member having a central opening therein;

a first counter-sink section adjacent one end of said central opening;

a second counter-sink section adjacent an opposite end of said central opening; and a third counter-sink adjacent said second counter-sink section and of a larger diameter.

19. In the gas chromatograph/mass spectrometer of claim 18, the improvement additionally including a sorption pump and at least one ion pump operatively connected to cooperate with said vacuum housing.

20. The improvement of claim 18, wherein said third counter-sink section of said flange is provided with a tapering outer end.

* * * * *